US007889100B2

(12) United States Patent
Miller

(10) Patent No.: US 7,889,100 B2
(45) **Date of Patent: *Feb. 15, 2011**

(54) WATER FRIEND OR FOE SYSTEM FOR GLOBAL VESSEL IDENTIFICATION AND TRACKING

(75) Inventor: Landon C. G. Miller, Tuscaloosa, AL (US)

(73) Assignee: International Business Machines Corporation, Armonk, NY (US)

( * ) Notice: Subject to any disclaimer, the term of this patent is extended or adjusted under 35 U.S.C. 154(b) by 600 days.

This patent is subject to a terminal disclaimer.

(21) Appl. No.: 11/838,637

(22) Filed: Aug. 14, 2007

(65) Prior Publication Data

US 2009/0045983 A1 Feb. 19, 2009

(51) Int. Cl.
*G08B 23/00* (2006.01)
*G08G 3/00* (2006.01)
*G01S 13/78* (2006.01)

(52) U.S. Cl. .......................... 340/984; 340/985; 342/45

(58) Field of Classification Search ................. 340/984, 340/985; 342/45
See application file for complete search history.

(56) References Cited

U.S. PATENT DOCUMENTS 3,988,725 A 10/1976 Doherty
4,365,238 A 12/1982 Kollin
4,622,540 A 11/1986 Guscott et al.
5,161,203 A 11/1992 Buckley
5,432,515 A 7/1995 O'Conner
5,495,237 A 2/1996 Yuasa et al.
5,566,092 A 10/1996 Wang et al.
5,809,499 A 9/1998 Wong et al.
5,896,082 A 4/1999 McFarlane
5,940,529 A 8/1999 Buckley
6,249,241 B1 6/2001 Jordan et al.
6,257,354 B1 7/2001 Schrader et al.
6,427,121 B2 * 7/2002 Brodie ........................ 701/213
6,437,692 B1 8/2002 Petite et al.
6,515,586 B1 2/2003 Wymore
6,735,630 B1 5/2004 Gelvin et al.
6,930,596 B2 8/2005 Kulesz et al.
6,987,459 B2 1/2006 Tice
7,025,130 B2 4/2006 Bailey et al.
7,053,770 B2 5/2006 Ratiu et al.
7,148,803 B2 * 12/2006 Bandy et al. ........... 340/539.16
7,233,795 B1 * 6/2007 Ryden ........................ 455/445
7,271,704 B2 9/2007 McSheffrey et al.
7,475,428 B2 1/2009 Smith et al.
7,496,472 B2 2/2009 Seem
7,528,711 B2 5/2009 Kates
7,693,589 B2 4/2010 Miller (Continued)

OTHER PUBLICATIONS

U.S. Appl. No. 11/837,921, Non-Final Office Action dated Dec. 29, 2009.

(Continued)

*Primary Examiner*—Daniel Wu
*Assistant Examiner*—Mark Rushing
(74) *Attorney, Agent, or Firm*—Dillon & Yudell LLP

(57) ABSTRACT

A Water Friend or Foe System (WFSS) includes a Subscriber Identity Module (SIM) card in a SIM reader on a marine vessel. A transmitter, which is coupled to the SIM reader, transmits information from the SIM card, as well as positioning information, to a WFFS tracking station.

6 Claims, 8 Drawing Sheets

U.S. PATENT DOCUMENTS

| | | | |
|---|---|---|---|
| 7,710,257 | B2 | 5/2010 | Miller |
| 7,710,258 | B2 | 5/2010 | Miller |
| 7,710,259 | B2 | 5/2010 | Miller |
| 7,710,260 | B2 | 5/2010 | Miller |
| 2003/0171939 | A1 | 9/2003 | Yagesh et al. |
| 2004/0006655 | A1 * | 1/2004 | Toffolet ......................... 710/1 |
| 2005/0124291 | A1 | 6/2005 | Hart et al. |
| 2005/0271266 | A1 | 12/2005 | Perrier |
| 2005/0275530 | A1 | 12/2005 | Kates |
| 2006/0176169 | A1 | 8/2006 | Doolin et al. |
| 2007/0015548 | A1 * | 1/2007 | Flick ....................... 455/569.2 |
| 2007/0061022 | A1 | 3/2007 | Hoffberg-Borghesani et al. |
| 2007/0096899 | A1 * | 5/2007 | Johnson ................. 340/539.13 |
| 2007/0097993 | A1 | 5/2007 | Bojahra et al. |
| 2007/0132846 | A1 | 6/2007 | Broad et al. |
| 2007/0167859 | A1 | 7/2007 | Finnerman et al. |
| 2007/0250461 | A1 | 10/2007 | Sabe et al. |
| 2008/0094212 | A1 | 4/2008 | Breed |
| 2008/0109091 | A1 | 5/2008 | Joslin et al. |
| 2009/0022548 | A1 | 1/2009 | Bishop |

OTHER PUBLICATIONS

U.S. Appl. No. 11/837,955, Non-Final Office Action dated Aug. 17, 2009.

U.S. Appl. No. 11/838,656, Non-Final Office Action dated Jun. 22, 2009.

U.S. Appl. No. 11/838,618, Non-Final Office Action dated Jun. 22, 2009.

U.S. Appl. No. 11/838,729, Non-Final Office Action dated May 11, 2009.

U.S. Appl. No. 11/838,739, Non-Final Office Action dated May 15, 2009.

U.S. Appl. No. 11/838,739, Final Office Action dated Nov. 13, 2009.

U.S. Appl. No. 11/838,684, Non-Final Office Action dated Jun. 22, 2009.

U.S. Appl. No. 11/838,695, Non-Final Office Action dated Jun. 22, 2009.

U.S. Appl. No. 11/838,729, Notice of Allowance dated Nov. 17, 2009.

U.S. Appl. No. 11/838,684, Notice of Allowance dated Dec. 21, 2009.

U.S. Appl. No. 11/838,637, Non-Final Office Action dated Jan. 20, 2010.

U.S. Appl. No. 11/837,955, Final Office Action dated Mar. 5, 2010.

U.S. Appl. No. 11/838,739, Notice of Allowance dated Feb. 26, 2010.

U.S. Appl. No. 11/838,618, Notice of Allowance dated Dec. 17, 2009.

U.S. Appl. No. 11/838,656, Notice of Allowance dated Dec. 17, 2009.

U.S. Appl. No. 11/838,695, Notice of Allowance dated Dec. 17, 2009.

U.S. Appl. No. 11/837,886, Non-Final Office Action dated May 27, 2010.

U.S. Appl. No. 11/837,921, Final Office Action dated Jul. 8, 2010.

U.S. Appl. No. 11/838,769, Notice of Allowance dated Jun. 15, 2010.

* cited by examiner

WATER FRIEND OR FOE SYSTEM FOR GLOBAL VESSEL IDENTIFICATION AND TRACKING

The present invention is related to the subject matter of the following commonly assigned, copending United States patent applications: (1) Ser. No. 11/837,921 filed Aug. 21, 2007 entitled "Emergent Information Pattern Driven Sensor Networks"; (2) Ser. No. 11/837,955 filed Aug. 13, 2007 entitled "Emergent Information Database Management System"; (3) Ser. No. 11/838,684 filed Aug. 14, 2007 entitled "Pattern Driven Effectuator System"; (4) Ser. No. 11/838,729 filed Aug. 14, 2007 entitled "Anomaly Anti-Pattern"; and (5) Ser. No. 11/838,764 filed Aug. 14, 2007 entitled "Intelligence Driven Icons and Cursors". The content of the above-referenced applications is incorporated herein by reference.

BACKGROUND OF THE INVENTION

1. Technical Field

The present disclosure relates to the field of identifying friendly and potentially hostile marine vessels.

2. Description of the Related Art

Countries worldwide are susceptible to attacks from marine vessels, either by sovereign navies or by terrorists. Such marine vessels could be either (1) a weapon itself, such as a vessel that contains a load of Liquefied Natural Gas (LNG) or explosives, (2) a carrier of weapons that can be launched directly from the vessel, since vessels are able to easily penetrate coastal defenses by circumventing radar detection (e.g., through the use of small watercraft that are not visible to radar) or visual detection (e.g., by operating at night), or (3) an enabler of an attack, by employing subterfuge (e.g., by approaching a ship, harbor or shoreline by appearing to be engaged in harmless activity such as sightseeing, fishing, etc.) in delivering a weapon for the use of others. Likewise, when searching for such rogue vessels, one also needs to correctly identify "friendly" or non-threatening vessels as well in order to be able to quickly reduce the field of search and analysis to only those vessels which represent a possible threat. "Friendly" vessels are of two types: 1) authorized weapons carrying vessels such as the US Coast Guard, Police vessels, and the like, called "blue forces"; and 2) truly non-involved commercial and private vessels.

SUMMARY OF THE INVENTION

A Water Friend or Foe System (WFFS) includes a Subscriber Identity Module (SIM) card in a SIM reader on a marine vessel. A transmitter, which is coupled to the SIM reader, transmits SIM card identification information from the marine vessel to a WFFS tracking station.

In one embodiment, if the SIM card or the SIM reader are tampered with or disabled, the propulsion system of the marine vessel is shut down, and/or an alarm is transmitted to the WFFS tracking system.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Presently disclosed is a Water Friend or Foe System (WFFS) that tracks the location and identity of maritime traffic. Each tracked marine vessel is equipped with a Subscriber Identity Module (SIM) card reader, which reads SIM cards that have been issued to authorized users. If the SIM card or reader is tampered with, an alarm is set off, and the marine vessel's propulsion system may be shut down.

Figure 1:
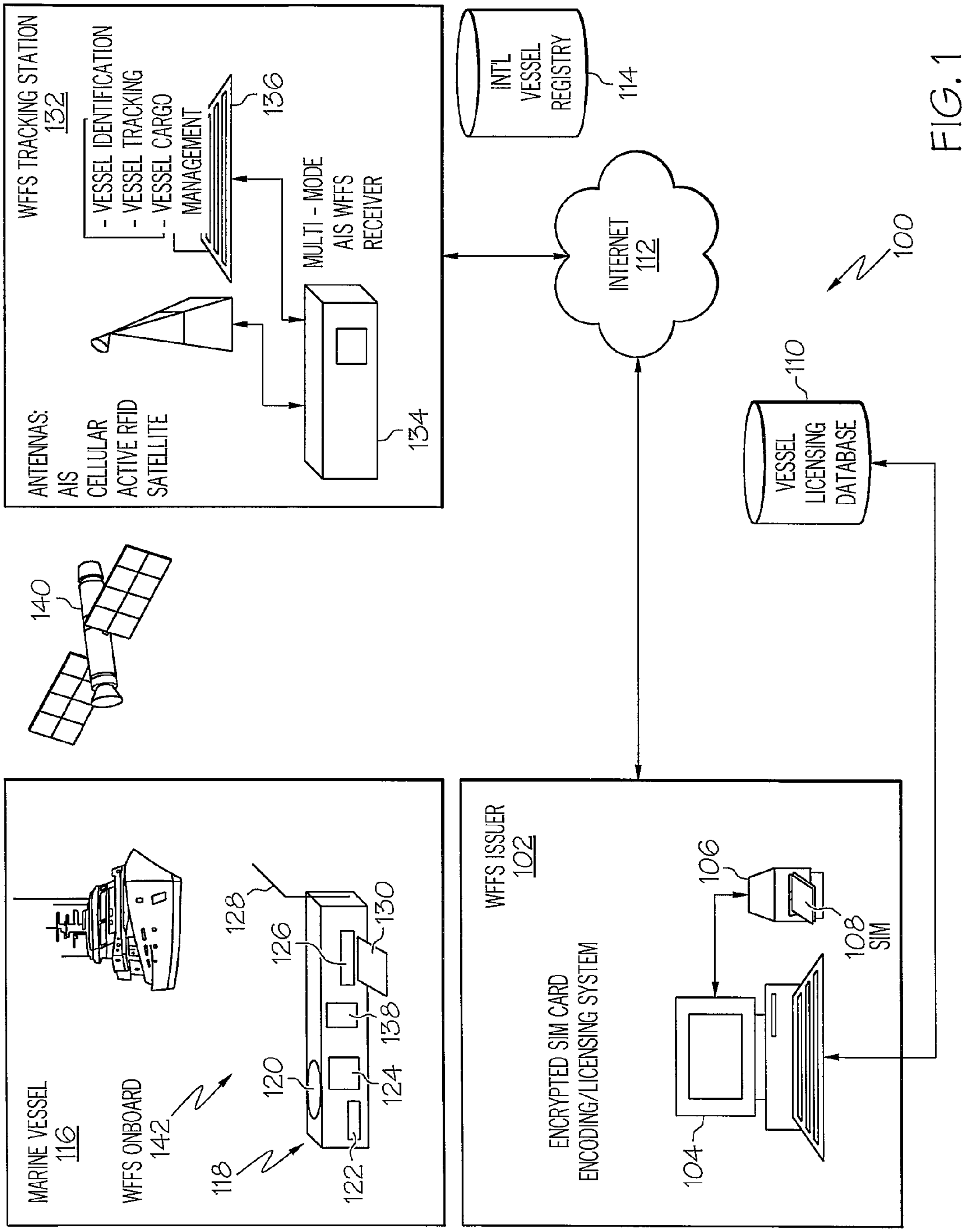
FIG. 1 is a schematic diagram of components of a Water Friend or Foe System (WFFS)

With reference now to FIG. 1, an overview of components of a WFFS 100 is presented. WFFS 100 includes a WFFS Issuer 102, which includes a general purpose computing system 104, depicted in an exemplary manner below in FIG. 4 as computer 402. General purpose computing system 104 can operate either as a Service Oriented Architecture (SOA) service, or as a stand-alone application on a personal computer. Coupled to the general purpose computing system 104 is a Subscriber Identity Module (SIM) card programmer 106. SIM card programmer 106 is able to store, on a SIM card 108, preferably in an encrypted format, marine vessel identification information which has been captured during the boat construction and registration processes, and then stored in a vessel licensing database 110. In one embodiment, the SIM card 108 is issued to authorized users periodically, (e.g., every two to three years, preferably during vessel licensing renewal). In one embodiment, WFFS issuer 102 can update information in the SIM card 108 (shown as SIM card 130 in marine vessel 116) via telecommunication, preferably via the WFFS tracking station 132's transceiver 134, which includes the functionality of a Multi-Mode AID WFFS Receiver.

Vessel information in the vessel licensing database 110 may be drawn, via an Internet 112 or similar network, from an international vessel registry 114, which is a consolidation of all licenses that permit a marine vessel to be sailing in international waters (defined as traveling more than 24 nautical miles from the nearest land mass). Alternatively, vessel licensing database 110 may include identification information for any marine vessel over a specified length (e.g., 17 feet) or displacement (e.g., over 10 tons).

Figure 4:
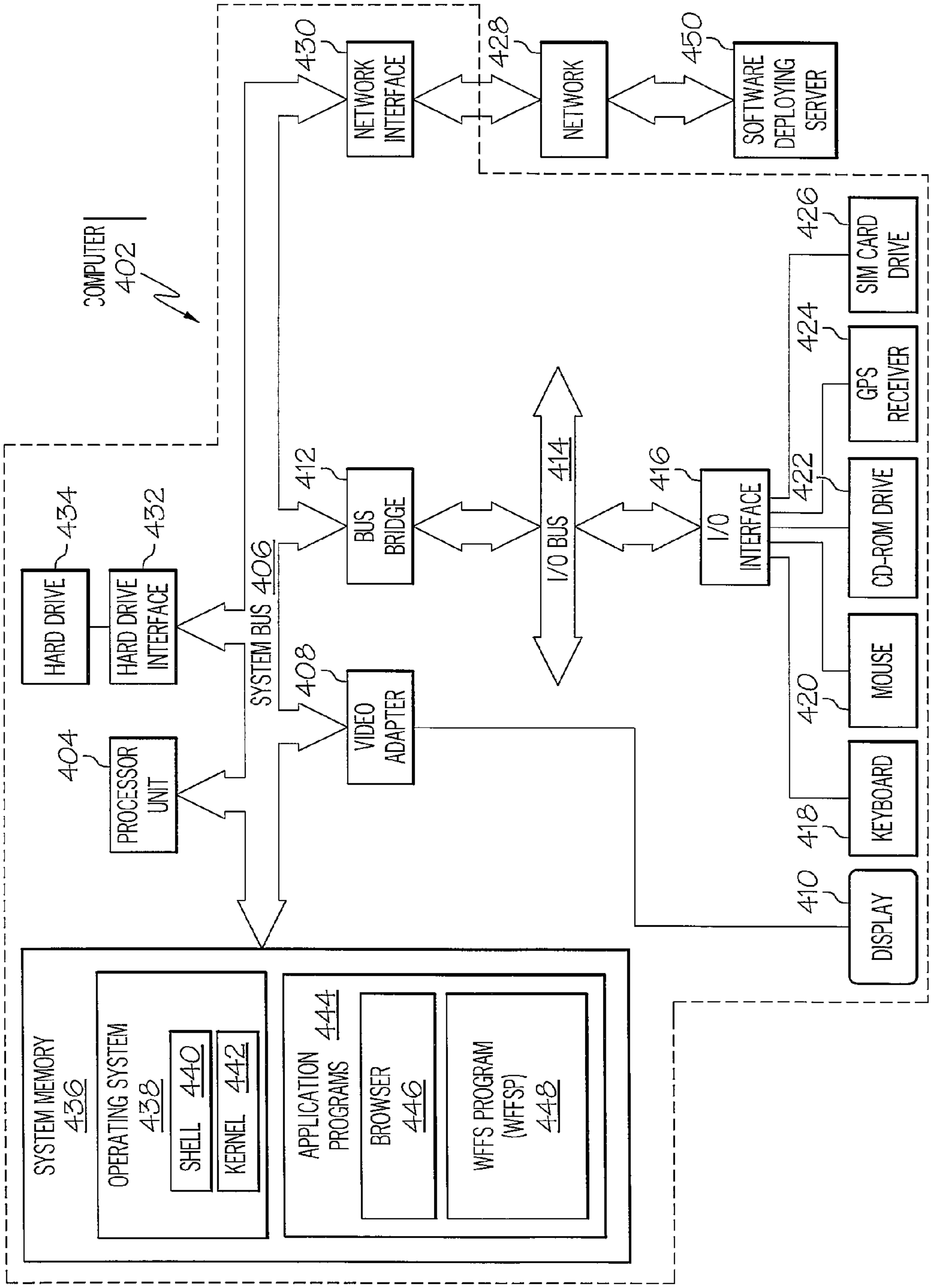
FIG. 4 illustrates an exemplary computer in which the present invention may be utilized.

On board a marine vessel 116 is a general purpose computer 118, shown in exemplary form in FIG. 4 as computer 402, which is coupled to a transceiver 120, which is a beefed-up transceiver that utilizes either ship or backup battery power. When on battery power, transceiver 120 goes into a less frequent update mode. In one embodiment, the transceiver comprises a standard Automatic Identifier System (AIS) chip set 138, which conforms to the International Telecommunication Union (ITU) Recommendation M.1371-1 for AIS. AIS allows ships in close proximity to provide maneuvering information to other ships. In the present invention, the transceiver 120 also comprises (or is coupled to) a) an active Radio Frequency Identification (RFID) chip or other similar smart card and/or chip-based technology performing similar functions, hereinafter for convenience called the RFID chip 122, a Global Information System (GIS) chip 124, a SIM card reader 126, and antennae 128.

RFID chip 122 enables the transceiver 120 to uniquely identify the transceiver 120 by being encoding with an encrypted, unique number that identifies the transceiver 120. In one embodiment, the RFID chip 122 transmits this unique identifier (the encrypted, unique number that identifies the transceiver 120) periodically (e.g., every five minutes), or depending upon the frequency of change in the ship's motion through monitoring commands to the propulsion system, more frequently or less frequently, using the antennae 128 in sequence of priority of (i) standard AIS, (ii) cellular, (iii) phased array/whip, (iv) mini-phased array or other satellite systems. Even if normal power to the transceiver 120 is disconnected, the transceiver 120 has a battery backup that enables the transceiver 120, in response to the normal (main) power being turned off, to continue to transmit the RFID chip information along with an alarm signal. This alarm signal indicates that the WFFS system, including the transceiver 120, RFID chip 122, and SIM card reader 126, has been improperly turned off without using the correct security codes and procedures. These security codes and procedures are preferably known by and available to only WFFS issuer 102, such that rogue sailors cannot disable the WFFS system onboard the marine vessel 116. The alarm signal continues to be broadcast until the battery power runs out, thus giving maritime authorities time to investigate the anomaly. This "anyway" transmission is for both emergency purposes, as well as to deter tampering by terrorists, pirates or other bad actors.

GIS chip 124 and associated antenna transmit a digital signal to the general purpose computer 118, preferably every N (e.g., 1) seconds, which provides global location information in real time for the marine vessel 116.

SIM card reader 126 reads a SIM card 130, which contains unique vessel identifying information for marine vessel 116, as well as an identity of an authorized user of SIM card 130 in one embodiment. The SIM card 130 was created by the WFFS issuer 102, and distributed to only authorized persons aboard the marine vessel 116. The SIM card information (which is tied to the vessel licensing database 110 and was captured during a vessel registration process) is digitally sent to the general purpose computer 118 for inclusion in both standard AIS formatted messages, using a standard AIS chip set 138, including the free format message types for bi-directional communications as well for additional messages sent by other than AIS message format (e.g., satellite transmissions using the Global Maritime Distress Safety System (GMDSS)) when the unit is transmitting.

Antennae 128 are used by the general purpose computer 118, the RFID chip 122, and a global locator (e.g., GPS receiver 206 shown below in FIG. 2) to transmit (either or both, but not both simultaneously) secure identity and location information for the marine vessel 116 over the following standards (in priority sequence): (i) AIS digital VHF radio; (ii) cellular GSM, CDMA, Wi-Fi variants, and other cellular frequencies in order of most likely to connect sequence; (iii) whip antenna for digital radio transmission on other frequencies not necessarily specified herein; and (iv) satellite (via a satellite 140), in priority of iridium, enmarsat, and other frequencies which have transponders available for reception and forwarding of such messages. This communication is via a network, such as network 428 depicted below in FIG. 4.

WFFS tracking station 132 includes a transceiver 134, which includes a receiver that is designed to accept transmissions captured natively on antennae, or via downlink from satellites, or via digital network connections from other antennae. Software (e.g., WFFS program 448 shown in FIG. 4) in a computer 136 (which is coupled to the transceiver 134) decodes, formats, reconciles duplicates, manages alarms anomalies from the transceiver 120, checks and compares databases (i.e., vessel licensing database 110 compared with international vessel registry 114), and otherwise supports those organizations and individuals who need to know vessel identification, accompanying cargo, personnel, stores, fuel, ownership, operators, passengers, and other vessel related information, as well as current (and projected) position, rate of travel, shipping lane traversal, and other vessel related information for the marine vessel 116.

Note that WFFS issuer 102 and/or tracking station 132 may be managed by the International Maritime Organization (IMO), or by any service provider. Note also that while transceiver 120 and general purpose computer 118 are shown as a single unit, in one embodiment transceiver 120, SIM card reader 126, and other components shown as part of the WFFS onboard 142 may be a separate devices that are coupled to general purpose computer 118.

Figure 2:
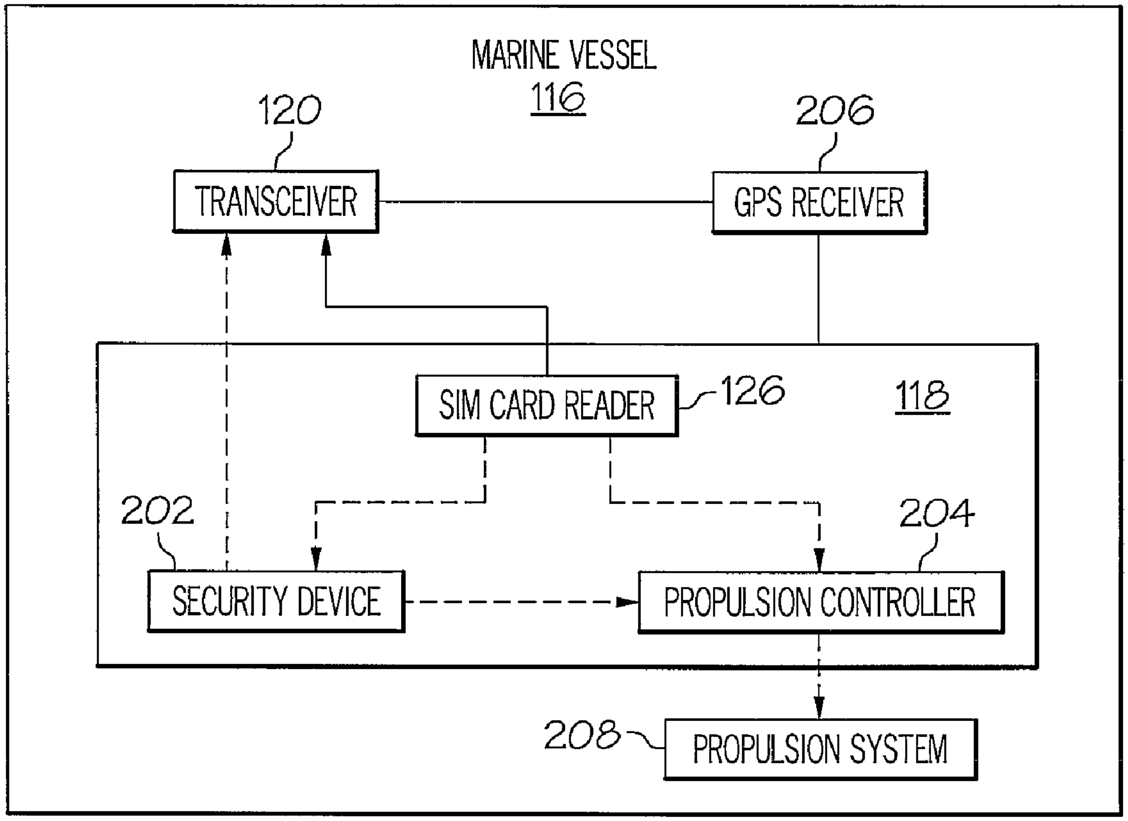
FIG. 2 depicts additional detail of the WFFS system on a marine vessel.

Additional detail for general purpose computer 118 as used on marine vessel 116 is shown in FIG. 2. As described above, general purpose computer 118 includes (or is coupled to) SIM card reader 128. Note also that a Global Positioning Satellite (GPS) receiver 206 is coupled to the transceiver 120 and/or the general purpose computer 118. GPS is an exemplary type of Global Information System (GIS) that globally pinpoints a real-time location of the marine vessel through the use of positioning satellites. In addition, general purpose computer 118 includes a security device 202 and a propulsion controller 204.

Note that in one embodiment, the WFFS system described herein may utilize Global Information System (GIS) and identification system transceivers that are located on multiple marine vessels, and which are capable of interacting with each other. That is, each transceiver on each vessel is able to track the location of, and confirm the identity of, other marine vessels in real time by received SIM data and GIS data from different vessels' transceivers, thus exchanging similar identification among all such transceivers in range.

The security device 202 may take on different forms, including a password entry detector (for using a SIM card or a SIM card reader), a fingerprint detection system that biometrically confirms a user's identity through the use of a fingerprint recognition membrane on the SIM card), etc. If the security device detects that the SIM card reader 126 or SIM card 130 is tampered with (including SIM card reader 126 and/or transceiver 120 being disconnected from the general purpose computer 118 or being turned off, an unauthorized user of the SIM card 130 attempting to access the WFFS onboard 142, etc.), an alarm signal is sent to the transceiver 120, which may send an alert to the WFFS tracking station 132 via GMDSS or other available networks, notifying the station that an anomaly (malicious, accidental or otherwise) has occurred in the WFFS system on the marine vessel 116.

Similarly, if a tampering with or an anomaly in the SIM card reader 126 or SIM card 130 occurs, a signal may be sent to the propulsion controller 204, which shuts down the propulsion system 208. That is, the WFFS system, and particularly the SIM card reader 126, is interlinked with the control system of the marine vessel. Thus, if malicious actors attempt to tamper with or disable the SIM card reader 126 and its attendant transceiver 120, or to misuse the SIM card 130, then the ship is also disabled, such that the malicious actor cannot attempt to enter a restricted area undetected. A designated security approved person may use a 'master' or 'override' SIM card to re-enable the system, including the propulsion system at any time in order to re-establish ship control for maritime safety purposes. In the case of an 'in extremis' or very high risk situation, a special AIS communication using a free form message type may transmit a one-time "override" encrypted code to re-enable ship control, such code unknowable by ship operators or the WFFS system, from appropriate authorities such as the US Coast Guard, or a similar trusted party.

Figure 3:
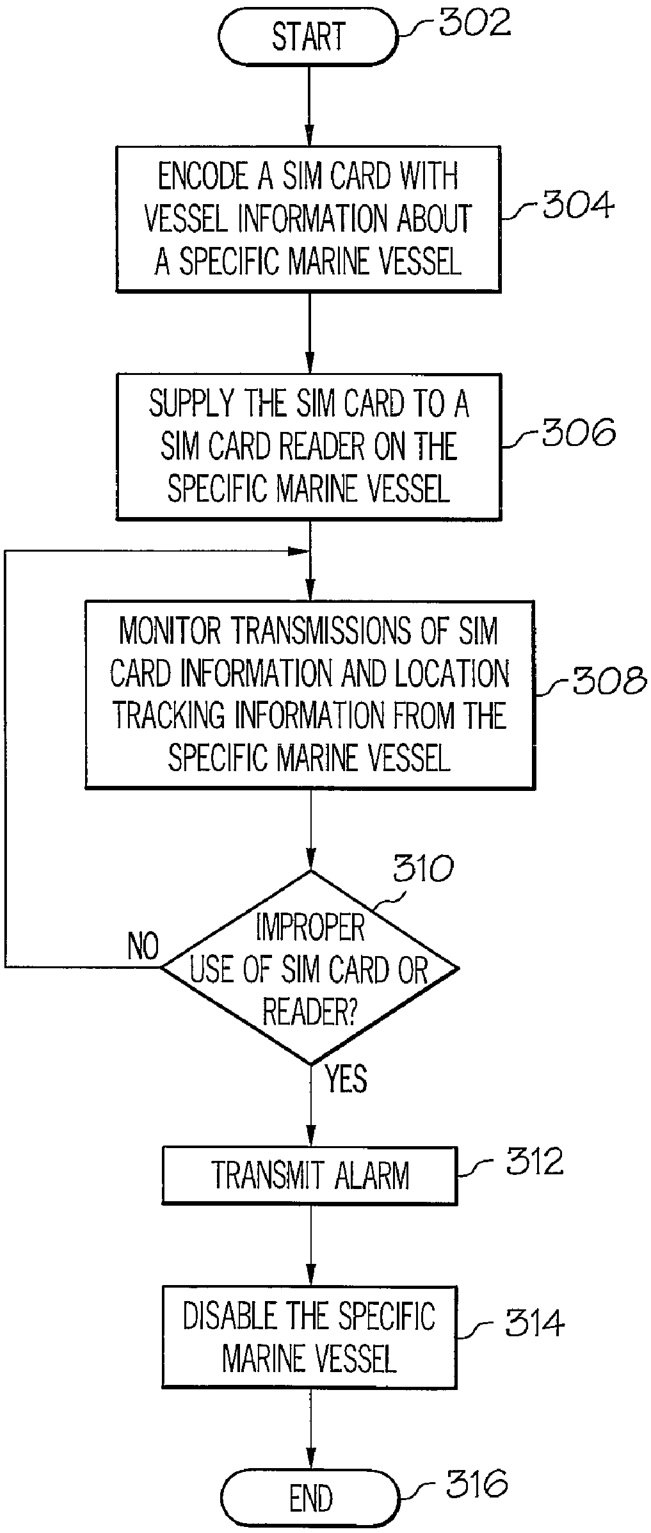
FIG. 3 is a high-level flow-chart of steps taken to monitor maritime traffic using the WFFS system.

Referring now to FIG. 3, a high-level flow chart of exemplary steps utilized by the WFFS system is presented. After initiator block 302, which may be prompted by a vessel being built or registered by a security agency, a SIM card is encoded with vessel information that is unique to a specific marine vessel (block 304). This information may include the name, registry, owner, authorized operators, etc. for that vessel. Note that the SIM card can also contain the name, password, and other information for a specific user who is authorized to use the SIM card on board that vessel. Thus, a single vessel may have multiple SIM cards, which may have to be used in conjunction. That is, in one embodiment, the WFFS system on board the marine vessel may be configured such that two or more SIM cards must be used by their authorized user in order to manipulate (take off line, maintain, encrypt with new data, etc.) a SIM card or a SIM card reader.

The one or more SIM cards are then delivered (block 306). Once the marine vessel is underway, a WFFS tracking station monitors prescribed transmissions from the marine vessel (block 308). These transmissions, preferably in the AIS format or the GMDSS format utilizing a message type adapted for this purpose, include the SIM card enabled descriptors for the marine vessel and/or SIM card user, as well as the real-time global position of the marine vessel. Note that in an alternate embodiment, SIM card, location and other such information is exchanged among other marine vessels in the WFFS system, such that these vessels are "self policing," rather than rely on the WFFS tracking station to monitor marine vessel traffic. As such, the vessels themselves can take action to address anomalies with the WFFS system as described herein. For example, a military fleet could monitor ships in its own fleet. Alternatively, the monitoring vessels can communicate an anomaly existence to the WFFS tracking station or the WFFS issuer.

As suggested by query block 310, if the SIM card and/or SIM card reader are tampered with in an unauthorized manner (as described in exemplary manner above), then the WFFS system on the marine vessel transmits an alarm (block 312) and/or disables the marine vessel (block 314). The process ends at terminator block 316, at which point law enforcement or other maritime management authorities can take further appropriate action with regards to the marine vessel. Such appropriate action may include communications (radio, e-mail, etc.) with the marine vessel to perform an initial investigation of the cause of the SIM anomaly. If warranted, additional steps can be taken, up to boarding and impounding the marine vessel, if so warranted.

With reference now to FIG. 4, there is depicted a block diagram of an exemplary computer 402, in which the present invention may be utilized. Note that some or all of the exemplary architecture shown for computer 402 may be utilized by software deploying server 450, general purpose computer 118, general purpose computing system 104, and computer 136.

Computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk-Read Only Memory (CD-ROM) drive 422, a GPS receiver 424 (e.g., GPS receiver 206 shown in FIG. 2), and a SIM card drive 426 (e.g., SIM card program 106 and/or SIM card reader 126 shown in FIG. 1). The format of the ports connected to I/O interface 416 may be any known to those skilled in the art of computer architecture, including but not limited to Universal Serial Bus (USB) ports.

Computer 402 is able to communicate with a software deploying server 450 via a network 428 using a network interface 430, which is coupled to system bus 406. Network 428 may be an external network such as the Internet (such as shown in FIG. 1), a wireless, radio or satellite network (also described in FIG. 1), or an internal network such as an Ethernet or a Virtual Private Network (VPN).

A hard drive interface 432 is also coupled to system bus 406. Hard drive interface 432 interfaces with a hard drive 434. In a preferred embodiment, hard drive 434 populates a system memory 436, which is also coupled to system bus 406. System memory is defined as a lowest level of volatile memory in computer 402. This volatile memory includes additional higher levels of volatile memory (not shown), including, but not limited to, cache memory, registers and buffers. Data that populates system memory 436 includes computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., computer 402) to send and receive network messages to the Internet using HyperText Transfer Protocol (HTTP) messaging, thus enabling communication with software deploying server 450 and other described computer systems.

Application programs 444 in computer 402's system memory (as well as software deploying server 450's system memory) also include a Water Friend or Foe System Program (WFFSP) 448 (which may provide the service described herein). WFFSP 448 includes code for implementing the processes described in FIGS. 1-3. In one embodiment, computer 402 is able to download WFFSP 448 from software deploying server 450.

The hardware elements depicted in computer 402 are not intended to be exhaustive, but rather are representative to highlight essential components required by the present invention. For instance, computer 402 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 450 performs all of the functions associated with the present invention (including execution of WFFSP 448), thus freeing computer 402 from having to use its own internal computing resources to execute WFFSP 448.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of WFFSP 448, are performed by service provider server 450. Alternatively, WFFSP 448 and the method described herein, and in particular as shown and described in FIGS. 1-3, can be deployed as a process software from service provider server 450 to computer 402. Still more particularly, process software for the method so described may be deployed to service provider server 450 by another service provider server (not shown).

Figure 5A:
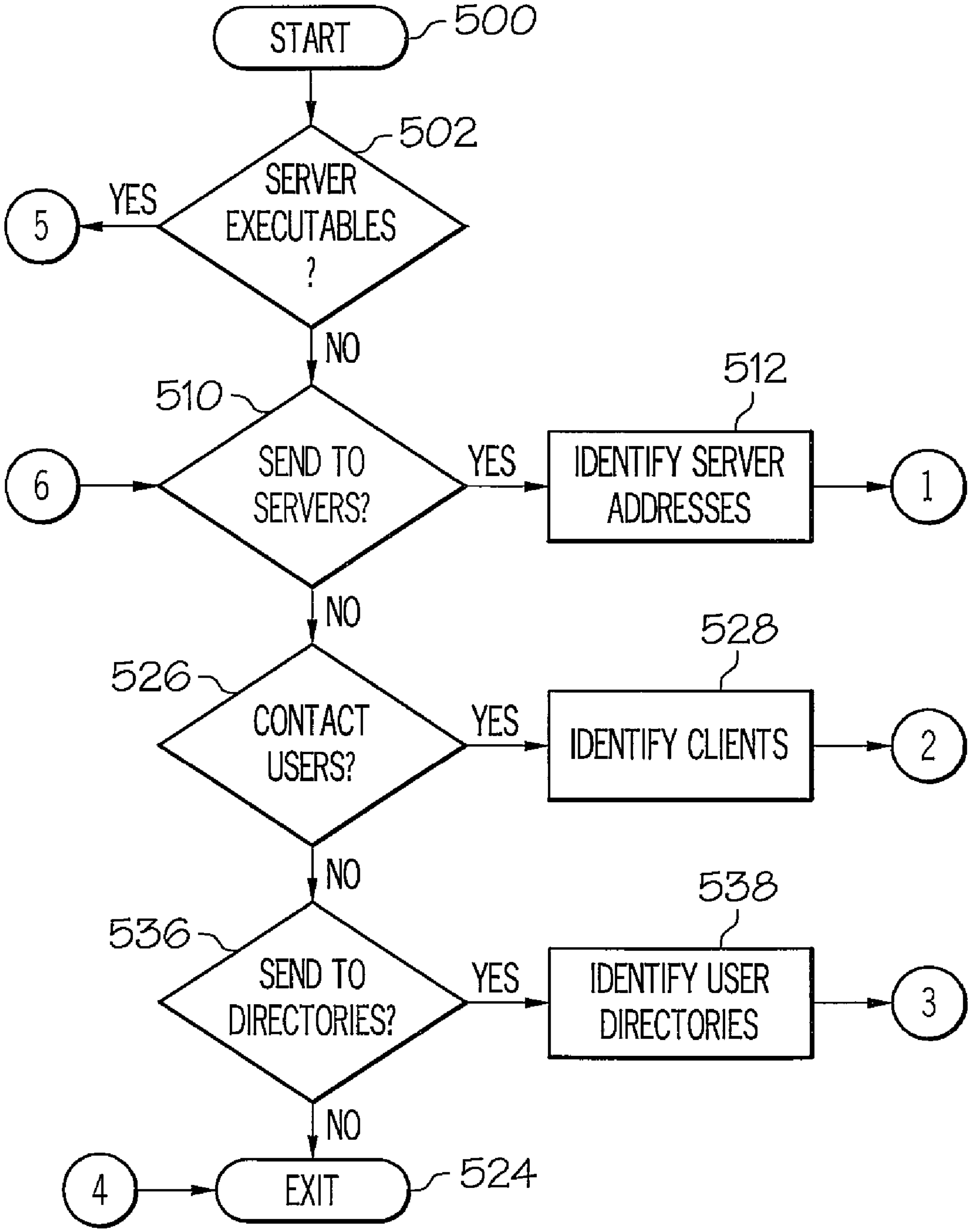
FIGS. 5A-B are flow-charts showing steps taken to deploy software capable of executing the steps described in FIGS. 1-3.
Figure 5B:
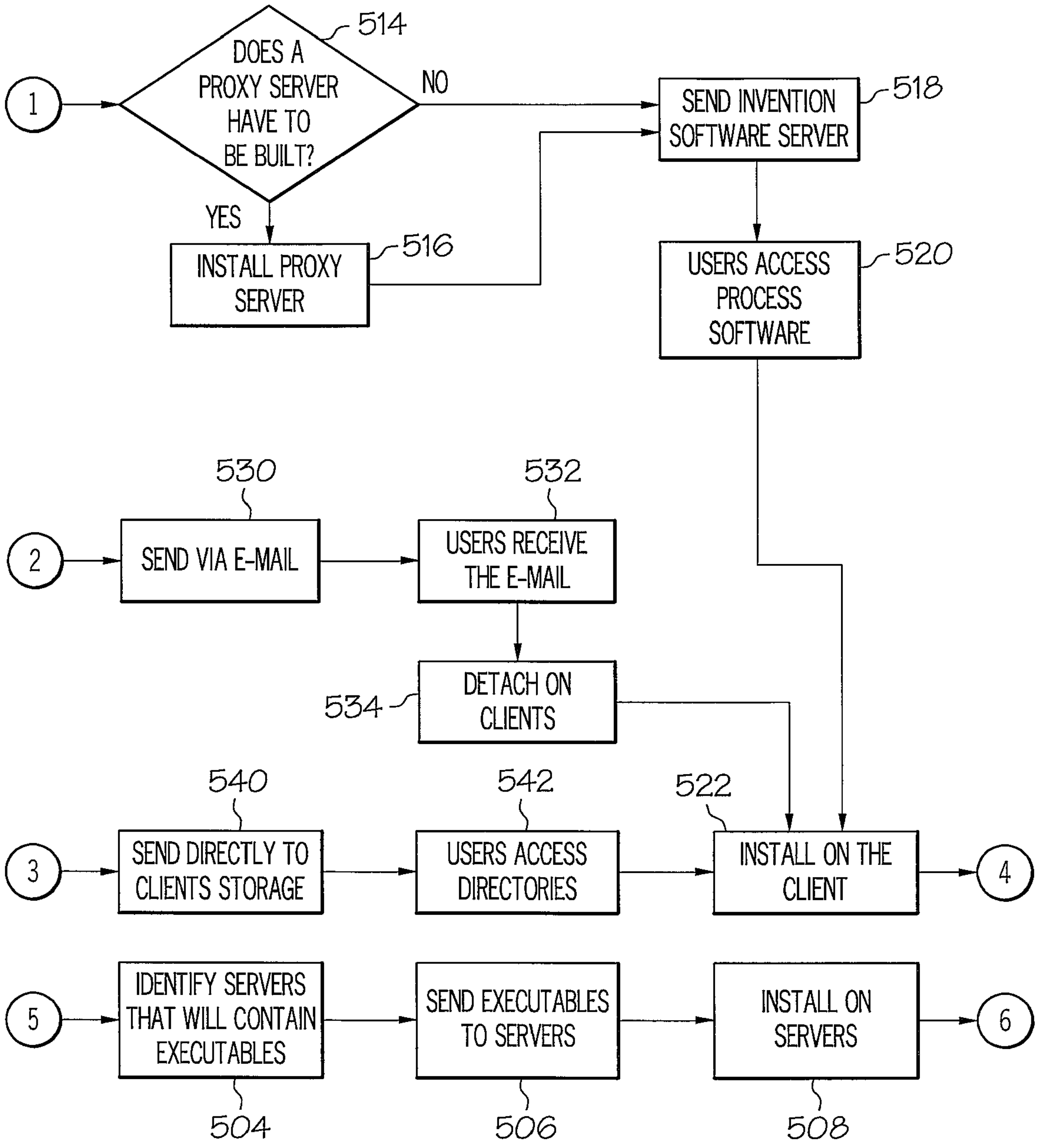

Referring then to FIGS. 5A-B, step 500 begins the deployment of the process software. The first thing is to determine if there are any programs that will reside on a server or servers when the process software is executed (query block 502). If this is the case, then the servers that will contain the executables are identified (block 504). The process software for the server or servers is transferred directly to the servers' storage via File Transfer Protocol (FTP) or some other protocol or by copying though the use of a shared file system (block 506). The process software is then installed on the servers (block 508).

Next, a determination is made on whether the process software is to be deployed by having users access the process software on a server or servers (query block 510). If the users are to access the process software on servers, then the server addresses that will store the process software are identified (block 512).

A determination is made if a proxy server is to be built (query block 514) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 516). The process software is sent to the servers either via a protocol such as FTP or it is copied directly from the source files to the server files via file sharing (block 518). Another embodiment would be to send a transaction to the servers that contained the process software and have the server process the transaction, then receive and copy the process software to the server's file system. Once the process software is stored at the servers, the users, via their computers, then access the process software on the servers and copy to their computers file systems (block 520). Another embodiment is to have the servers automatically copy the process software to each client and then run the installation program for the process software at each computer. The user executes the program that installs the process software on his computer (block 522) then exits the process (terminator block 524).

In query step 526, a determination is made whether the process software is to be deployed by sending the process software to users via e-mail. The set of users where the process software will be deployed are identified together with the addresses of the user computers (block 528). The process software is sent via e-mail to each of the users' computers (block 530). The users then receive the e-mail (block 532) and then detach the process software from the e-mail to a directory on their computers (block 534). The user executes the program that installs the process software on his computer (block 522) then exits the process (terminator block 524).

Lastly a determination is made as to whether the process software will be sent directly to user directories on their computers (query block 536). If so, the user directories are identified (block 538). The process software is transferred directly to the user's computer directory (block 540). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 542). The user executes the program that installs the process software on his computer (block 522) and then exits the process (terminator block 524).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Those familiar with the art of data communications would understand that various other secure communications processes, such as HTTPS: Peer-to-peer, et. al., are all equally appropriate to VPN's for providing a communication and data transportation process for interconnecting servers and targets involved in software deployment and provisioning.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6A:
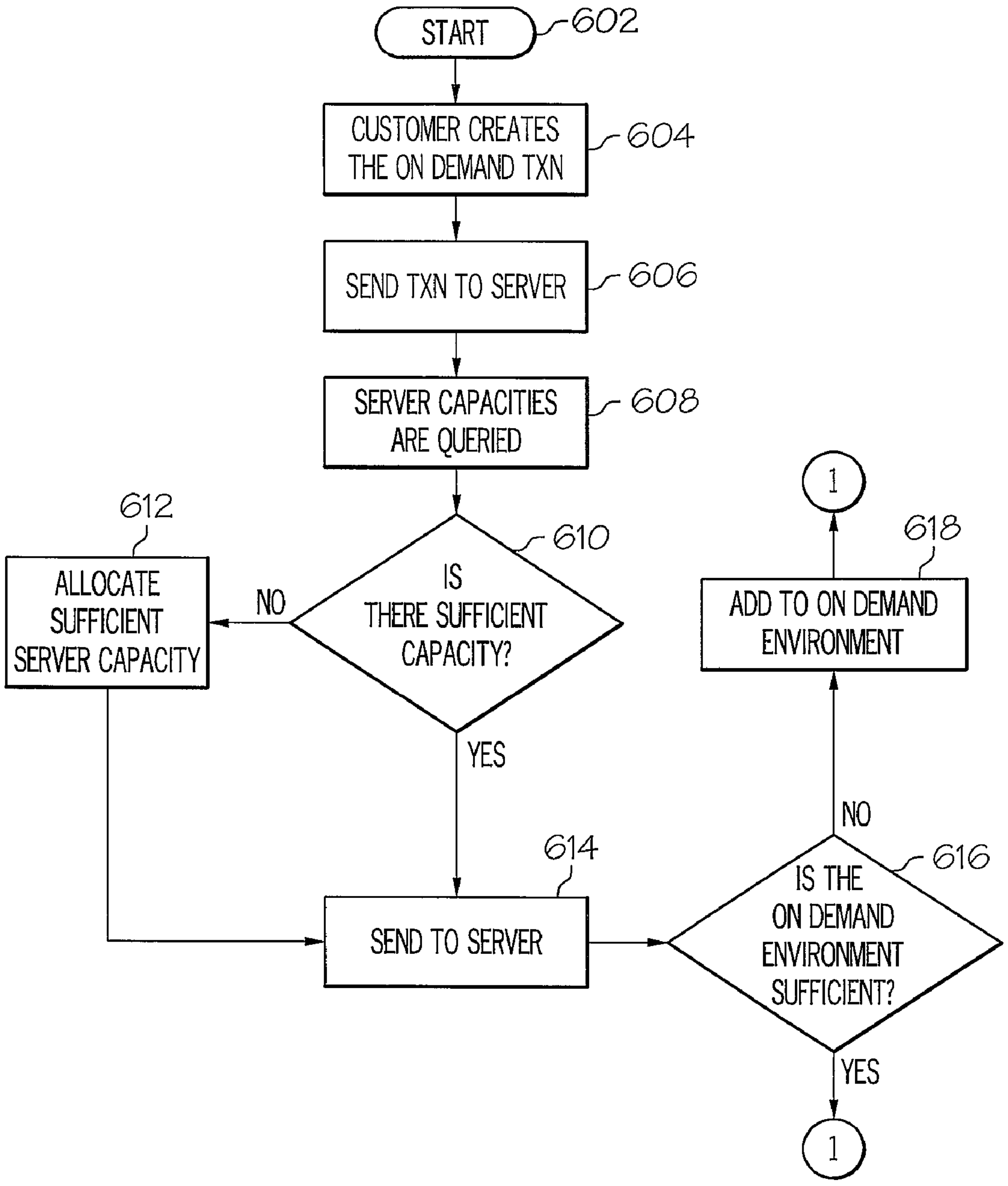
FIGS. 6A-B are flow-charts showing steps taken to execute the steps shown in FIGS. 1-3 using an on-demand service provider.
Figure 6B:
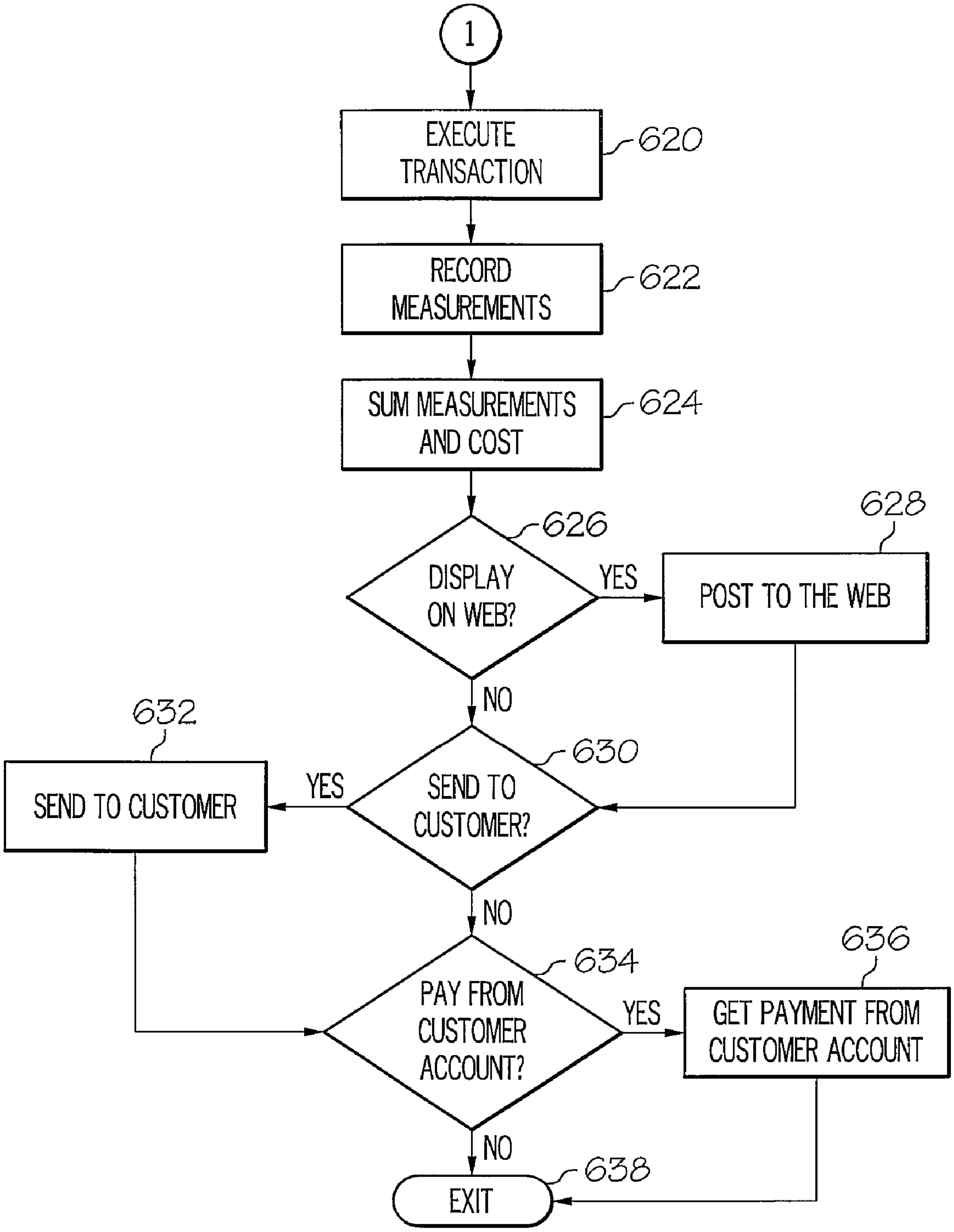

With reference now to FIGS. 6*a*-*b*, initiator block 602 begins the On Demand process. A transaction is created than contains the unique customer identification, the requested service type and any service parameters that further, specify the type of service (block 604). The transaction is then sent to the main server (block 606). In an On Demand environment the main server can initially be the only server, then as capacity is consumed other servers are added to the On Demand environment.

The server central processing unit (CPU) capacities in the On Demand environment are queried (block 608). The CPU requirement of the transaction is estimated, then the server's available CPU capacity in the On Demand environment is compared to the transaction CPU requirement to see if there is sufficient CPU available capacity in any server to process the transaction (query block 610). If there is not sufficient server CPU available capacity, then additional server CPU capacity is allocated to process the transaction (block 612). If there was already sufficient available CPU capacity then the transaction is sent to a selected server (block 614).

Before executing the transaction, a check is made of the remaining On Demand environment to determine if the environment has sufficient available capacity for processing the transaction. This environment capacity consists of such things as but not limited to network bandwidth, processor memory, storage etc. (block 616). If there is not sufficient available capacity, then capacity will be added to the On Demand environment (block 618). Next the required software to process the transaction is accessed, loaded into memory, then the transaction is executed (block 620).

The usage measurements are recorded (block 622). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 624).

If the customer has requested that the On Demand costs be posted to a web site (query block 626), then they are posted (block 628). If the customer has requested that the On Demand costs be sent via e-mail to a customer address (query block 630), then these costs are sent to the customer (block 632). If the customer has requested that the On Demand costs be paid directly from a customer account (query block 634), then payment is received directly from the customer account (block 636). The On Demand process is then exited at terminator block 638.

As described herein, the WFFS, or Water Friend or Foe System, comprises three primary components: (1) a combined AIS/GPS digital radio which requires (a) an imbedded, encrypted Active RFID chip, (b) an encrypted SIM card containing vessel information, and (c) a set of antennas for AIS, cellular, satellite and active RFID transmission, (2) a SIM card programmer and associated computer and software for vessel licensing authorities to issue the SIM card when the vessel's license to operate is either initially issued or renewed, and (3) a WFFS receiver for various organizations (government, non-commercial, commercial, and military; either mobile or fixed; with either standard or portable power, including battery power and backup) with software to publish and subscribe to registration databases with the option of connecting to an international database or databases containing all vessels classified as AIS Class A or B using the International Standard for Vessels 1371.

The advantages of certain embodiments of the presently described invention include the following: (1) this invention solves a very large problem in the AIS and GMDSS systems today by eliminating the easy use of the shipboard AIS/GMDSS systems on board the vessel as transmitters of false and confusing data by preventing unauthorized changes of the ship's information when used in conjunction with the current AIS standard, (2) the WFFS system permits very large numbers of vessels to be self-identifying without a complete re-do of the global AIS & GMDSS standards; (3) WFFS provides this capability with very low cost per licensed vessel since the very large number of vessels (over 20 million in the US alone), and the need to re-issue the SIM cards every two or three years during vessel license renewal will result in revenues for these products and services sufficient to fund the operation of such a global system and thus high volume manufacturing related cost reductions; and (4) the WFFS system will be hard to defeat, and will be very difficult to spoof because it has multiple levels of security now integral to the system's operation.

Note that SIM and security data that is transmitted to and from the marine vessels described herein may utilize XML, GMDSS or other formatted messages, but which have been modified to accept the secure SIM data described herein.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A Water Friend or Foe System (WFFS), comprising:

a first computing system located at a WFFS issuer of marine vessel authenticators, the first computing system comprising:

a processor, a data bus coupled to the processor, a memory coupled to the data bus, wherein the memory is coupled to a vessel licensing database that includes vessel identification information, and a Subscriber Identity Module (SIM) card programmer, wherein the SIM card programmer is capable of storing, on a SIM card, vessel identification information, which is retrieved from the marine vessel licensing database, for a marine vessel;

wherein the first computing system is designed to support a system that comprises:

a first transceiver located on the marine vessel;

a Global Information System (GIS) system located on the marine vessel, wherein the GIS system is capable of identifying a location of the marine vessel, and wherein the GIS system derives global positioning information from a Global Positioning System (GPS) receiver that is located on the marine vessel;

a SIM card reader located on the marine vessel, wherein the SIM card reader is capable of reading, from the SIM card, vessel identification information about the marine vessel; and a second transceiver located at a WFFS tracking station, wherein the second transceiver tracks the location of, and confirms an identity of, the marine vessel in real time by received SIM data and GIS data that is transmitted from the first transceiver on the marine vessel, wherein the first transceiver is coupled to a Radio Frequency Identification (RFID) chip that identifies the first transceiver, and wherein the first transceiver periodically communicates an identity of the first transceiver to the second receiver based on data from the RFID chip; and wherein the GIS system includes a communication system selected from a group that includes a Global Marine Distress Safety System (GMDSS) transceiver, a GMDSS transmitter, and an Automatic Identifier System (AIS) transceiver; and wherein the GIS system includes a Global Information System (GIS) system located on one or more additional marine vessels capable of interacting with each other, wherein each additional transceiver tracks a location of, and confirms an identity of, other marine vessels in real time by received SIM data and GIS data that is transmitted from the first transceiver on the marine vessel, wherein SIM and GIS data is exchanged among all such transceivers in range; and wherein the GIS system on the marine vessel further comprises:

a controller coupled between the SIM card reader and a propulsion system for the marine vessel, wherein, in response to the controller detecting an anomaly with a SIM card in the SIM card reader, the controller disables the marine vessel by issuing a command that shuts down the propulsion system; and wherein the marine vessel further comprises:

a controller coupled between the SIM card reader and a propulsion system for the marine vessel, wherein, in response to the controller detecting an anomaly with the SIM card reader, the controller disables the marine vessel by issuing a command that shuts down the propulsion system; and wherein the marine vessel further comprises:

a security device coupled between the SIM card reader and the first transceiver located on the marine vessel, wherein, in response to the security device detecting a tampering of the SIM card reader, the first transceiver transmits a tampering alarm to the second transceiver.

2. A Water Friend or Foe System (WFFS), comprising:

a first computing system located at a WFFS issuer of marine vessel authenticators, the first computing system comprising:

a processor, a data bus coupled to the processor, a memory coupled to the data bus, wherein the memory is coupled to a vessel licensing database that includes vessel identification information, and a Subscriber Identity Module (SIM) card programmer, wherein the SIM card programmer is capable of storing, on a SIM card, vessel identification information, which is retrieved from the marine vessel licensing database, for a marine vessel;

wherein the first computing system is designed to support a system that comprises:

a first transceiver located on the marine vessel;

a Global Information System (GIS) system located on the marine vessel, wherein the GIS system is capable of identifying a location of the marine vessel; and a SIM card reader located on the marine vessel, wherein the SIM card reader is capable of reading, from the SIM card, vessel identification information about the marine vessel; and wherein the GIS system on the marine vessel further comprises:

a controller coupled between the SIM card reader and a propulsion system for the marine vessel, wherein, in response to the controller detecting an anomaly with a SIM card in the SIM card reader, the controller disables the marine vessel by issuing a command that shuts down the propulsion system.

3. A Water Friend or Foe System (WFFS), comprising:

a first computing system located at a WFFS issuer of marine vessel authenticators, the first computing system comprising:

a processor, a data bus coupled to the processor, a memory coupled to the data bus, wherein the memory is coupled to a vessel licensing database that includes vessel identification information, and a Subscriber Identity Module (SIM) card programmer, wherein the SIM card programmer is capable of storing, on a SIM card, vessel identification information, which is retrieved from the marine vessel licensing database, for a marine vessel;

wherein the first computing system is designed to support a system that comprises:

a first transceiver located on the marine vessel;

a Global Information System (GIS) system located on the marine vessel, wherein the GIS system is capable of identifying a location of the marine vessel; and a SIM card reader located on the marine vessel, wherein the SIM card reader is capable of reading, from the SIM card, vessel identification information about the marine vessel; and wherein the marine vessel further comprises:

a controller coupled between the SIM card reader and a propulsion system for the marine vessel, wherein, in response to the controller detecting an anomaly with the SIM card reader, the controller disables the marine vessel by issuing a command that shuts down the propulsion system.

4. A computer-readable storage medium embodying computer program code, the computer program code comprising instructions executable by the processor and configured for tracking marine vessels by performing the steps of:

encoding a Subscriber Identity Module (SIM) card with marine vessel information about a marine vessel;

supplying the SIM card to a SIM card reader on the marine vessel, wherein the marine vessel information and a real-time location of the marine vessel are transmittable to a tracking station;

encoding a security device on the SIM card for the marine vessel; and transmitting, by the transceiver on the marine vessel, an alarm message if the security device detects an unauthorized use of the SIM card;

wherein the computer program code is executed within a Water Friend or Foe System (WFFS), which comprises:

a first computing system located at a WFFS issuer of marine vessel authenticators, the first computing system comprising:

a processor, a data bus coupled to the processor, a memory coupled to the data bus, wherein the memory is coupled to a vessel licensing database that includes vessel identification information, and a Subscriber Identity Module (SIM) card programmer, wherein the SIM card programmer is capable of storing, on a SIM card, vessel identification information, which is retrieved from the marine vessel licensing database, for a marine vessel;

wherein the first computing system is designed to support a system that comprises:

a Global Information System (GIS) system located on the marine vessel, wherein the GIS system is capable of identifying a location of the marine vessel;

a SIM card reader located on the marine vessel, wherein the SIM card reader is capable of reading, from the SIM card, vessel identification information about the marine vessel; and a first transceiver located on the marine vessel, wherein the first transceiver transmits SIM data and GIS data to a second transceiver located at a WFFS tracking station, wherein the second transceiver tracks the location of, and confirms an identity of, the marine vessel in real time by received SIM data and GIS data that is transmitted from the first transceiver on the marine vessel; and wherein the first transceiver also transmits SIM data and GIS data to one or more transceivers of other marine vessels within a range of the first transceiver of the marine vessel;

wherein the GIS system on the marine vessel further comprises:

a controller coupled between the SIM card reader and a propulsion system for the marine vessel, wherein, in response to the controller detecting an anomaly with a SIM card in the SIM card reader, the controller disables the marine vessel by issuing a command that shuts down the propulsion system.

5. A computer-readable storage medium embodying computer program code, the computer program code comprising instructions executable by the processor and configured for tracking marine vessels by performing the steps of:

encoding a Subscriber Identity Module (SIM) card with marine vessel information about a marine vessel;

supplying the SIM card to a SIM card reader on the marine vessel, wherein the marine vessel information and a real-time location of the marine vessel are transmittable to a tracking station;

encoding a security device on the SIM card for the marine vessel; and transmitting, by the transceiver on the marine vessel, an alarm message if the security device detects an unauthorized use of the SIM card;

wherein the computer program code is executed within a Water Friend or Foe System (WFFS), which comprises:

a first computing system located at a WFFS issuer of marine vessel authenticators, the first computing system comprising:

a processor, a data bus coupled to the processor, a memory coupled to the data bus, wherein the memory is coupled to a vessel licensing database that includes vessel identification information, and a Subscriber Identity Module (SIM) card programmer, wherein the SIM card programmer is capable of storing, on a SIM card, vessel identification information, which is retrieved from the marine vessel licensing database, for a marine vessel;

wherein the first computing system is designed to support a system that comprises:

a Global Information System (GIS) system located on the marine vessel, wherein the GIS system is capable of identifying a location of the marine vessel;

a SIM card reader located on the marine vessel, wherein the SIM card reader is capable of reading, from the SIM card, vessel identification information about the marine vessel; and a first transceiver located on the marine vessel, wherein the first transceiver transmits SIM data and GIS data to a second transceiver located at a WFFS tracking station, wherein the second transceiver tracks the location of, and confirms an identity of, the marine vessel in real time by received SIM data and GIS data that is transmitted from the first transceiver on the marine vessel; and wherein the first transceiver also transmits SIM data and GIS data to one or more transceivers of other marine vessels within a range of the first transceiver of the marine vessel;

wherein the marine vessel further comprises:

a controller coupled between the SIM card reader and a propulsion system for the marine vessel, wherein, in response to the controller detecting an anomaly with the SIM card reader, the controller disables the marine vessel by issuing a command that shuts down the propulsion system.

6. The WFFS of claim 1, wherein the GIS system on the marine vessel further comprises one or more of:

a controller coupled between the SIM card reader and a propulsion system for the marine vessel, wherein, in response to the controller detecting an anomaly with a SIM card in the SIM card reader, the controller disables the marine vessel by issuing a command that shuts down the propulsion system;

a controller coupled between the SIM card reader and a propulsion system for the marine vessel, wherein, in response to the controller detecting an anomaly with the SIM card reader, the controller disables the marine vessel by issuing a command that shuts down the propulsion system; and a security device coupled between the SIM card reader and the first transceiver located on the marine vessel, wherein, in response to the security device detecting a tampering of the SIM card reader, the first transceiver transmits a tampering alarm to the second transceiver.

* * * * *